US012772341B2

(12) United States Patent
Tarayre et al.

(10) Patent No.: US 12,772,341 B2
(45) Date of Patent: Oct. 20, 2026

(54) HEATING SYSTEM COMPRISING A RESISTIVE HEAT ELEMENT, CONTROLLER FOR SUCH HEATING SYSTEM, AND METHOD OF CONTROLLING A LOAD CURRENT THROUGH SUCH RESISTIVE HEAT ELEMENT

(71) Applicant: EQON AS, Stavanger (NO)

(72) Inventors: Christophe Tarayre, Bru (NO); Trond Spande, Stavanger (NO)

(73) Assignee: EQON AS, Stavanger (NO)

( * ) Notice: Subject to any disclaimer, the term of this patent is extended or adjusted under 35 U.S.C. 154(b) by 549 days.

(21) Appl. No.: 18/546,995

(22) PCT Filed: Feb. 8, 2022

(86) PCT No.: PCT/NO2022/050035
§ 371 (c)(1),
(2) Date: Aug. 18, 2023

(87) PCT Pub. No.: WO2022/177442
PCT Pub. Date: Aug. 25, 2022

(65) Prior Publication Data
US 2024/0314888 A1 Sep. 19, 2024

(30) Foreign Application Priority Data
Feb. 22, 2021 (NO) .................................... 20210225

(51) Int. Cl.
*H05B 1/02* (2006.01)
*F24D 13/02* (2006.01)
(Continued)

(52) U.S. Cl.
CPC ......... *H05B 1/0275* (2013.01); *F24D 13/024* (2013.01); *F24D 19/1096* (2013.01); *H02M 3/158* (2013.01)

(58) Field of Classification Search
CPC . H05B 1/0275; F24D 13/024; F24D 19/1096; H02M 3/158
See application file for complete search history.

(56) References Cited

U.S. PATENT DOCUMENTS 7,652,395 B2 * 1/2010 Von Arx ............. H01R 9/2425 361/600
11,454,677 B2 * 9/2022 Knappenberger ... G01R 15/202
(Continued)

FOREIGN PATENT DOCUMENTS

DE 202013003006 U1 4/2013
EP 2916191 A1 9/2015
NO 20191312 5/2021

OTHER PUBLICATIONS

Rakesh Panguloori, "Achieve Bidirectional Control and Protection Through Back-to-Back Connected eFuse Devices", Texas Instruments Application Report SLVA948, Dec. 2017, pp. 1-10. (Year: 2017).*
(Continued)

*Primary Examiner* — Lorne E Meade
(74) *Attorney, Agent, or Firm* — Andrus Intellectual Property Law, LLP

(57) ABSTRACT

A heating system having: i) at least one resistive heat element; ii) at least two terminals for receiving a grid voltage from a power grid, and iii) a controller for being connected to the terminals for receiving the grid voltage, the controller connected to the at least one resistive heat element and being configured for controlling a load current through the at least one resistive heat element, wherein the controller is configured controlling the load current though the at least one resistive heat element. The controller comprises an FCFO-bidirectional power switch connected in series with the at least one resistive element for controlling the load current that is received from the power grid. A method is for
(Continued)

controlling the load current through the at least one resistive element, which applies a certain algorithm to avoid inrush current, shortens the length of a cold start and solves problems such as EML.

8 Claims, 6 Drawing Sheets

(51) Int. Cl.

| | |
|---|---|
| ***F24D 19/10*** | (2006.01) |
| ***H02M 3/158*** | (2006.01) |

(56) References Cited

U.S. PATENT DOCUMENTS

| | | | | |
|---|---|---|---|---|
| 11,551,899 | B2 * | 1/2023 | Telefus | H02H 3/08 |
| 12,324,063 | B2 * | 6/2025 | Aske | E04F 15/02417 |
| 2006/0050464 | A1 | 3/2006 | von Arx et al. | |
| 2017/0191228 | A1 | 7/2017 | Dong | |
| 2018/0366945 | A1 | 12/2018 | Braginsky et al. | |
| 2019/0112766 | A1 | 4/2019 | Logan et al. | |
| 2019/0112767 | A1 | 4/2019 | Drake et al. | |
| 2020/0044883 | A1 | 2/2020 | Telefus et al. | |
| 2020/0365346 | A1 | 11/2020 | Telefus et al. | |

OTHER PUBLICATIONS

EiceDRIVER™ 1EDI Compact 150 mil Datasheet, version 1.20, Infineon Technologies AG, Munich, Germany, Dec. 2025, pp. 1-21. (Year: 2025).*

Extended European Search Report for EP Application No. 22756619.7, dated Jan. 22, 2025.

Norwegian Search Report for Corresponding NO Application No. 20210225, dated Sep. 9, 2021.

International Search Report and the Written Opinion for PCT/US2022/050035, dated May 4, 2022.

Response to the Written Opinion for PCT/US2022/050035, dated Dec. 6, 2022.

The Second Written Opinion for PCT/US2022/050035, dated Mar. 22, 2023.

International Preliminary Report on Patentability for PCT/US2022/050035, dated May 22, 2023.

"SCR Power Theory Training Manual" by Chromalox®, pp. 14-17. Available online at www.chromalox.com.

SLVA948 "Achieve Bidirectional Control and Protection Through Back-to-Back Connected eFuse Devices" pp. 2-3. Available online at https://www.scribd.com/document/408121767/slva948, published Dec. 2017.

Allegro Microsystems "ACS71020 Single Phase Isolated, AC Power Monitoring IC with Voltage Zero Crossing and Overcurrent Detection". Available online at www.allegromicro.com, published Dec. 17, 2021.

* cited by examiner

HEATING SYSTEM COMPRISING A RESISTIVE HEAT ELEMENT, CONTROLLER FOR SUCH HEATING SYSTEM, AND METHOD OF CONTROLLING A LOAD CURRENT THROUGH SUCH RESISTIVE HEAT ELEMENT

CROSS-REFERENCE TO RELATED APPLICATIONS

This application is the U.S. national stage application of International Application PCT/NO2022/050035, filed Feb. 8, 2022, which international application was published on Aug. 25, 2022, as International Publication WO 2022/177442 in the English language. The International Application claims priority of Norwegian patent Application No. 20210225, filed Feb. 22, 2021. The international application and Norwegian application are both incorporated herein by reference, in entirety.

FIELD OF THE INVENTION

The invention relates to a heating system comprising at least one resistive heat element, at least two terminals for receiving a grid voltage from a power grid, and a controller for being connected to the terminals for receiving the grid voltage, the controller connected to the at least one resistive heat element and being configured for controlling a load current through the at least one resistive heat element, wherein the controller is configured controlling the load current though the at least one resistive heat element. The invention further relates to a method of controlling a load current in a resistive load with a bidirectional power switch in a heating system that is connected to an alternating grid voltage, wherein the bidirectional power switch is controlled in a binary way, which includes a closed state, wherein the bidirectional power switch allows load current to flow in both directions and an open state, wherein the bidirectional power switch blocks the load current.

BACKGROUND OF THE INVENTION

Heating systems comprising resistive heat elements, such as resistive heating cables, are known, particularly from electrical floor heating systems. An example of such system is shown in non-prepublished patent application NO20191312 in the name of the same applicant as the current invention. There are certain challenges when such systems are started up, which is also being referred to as the cold-start. Typically, a controlled switch is used to allow load current to flow from the grid through the resistive heat elements. One of the problems, which arises when the controlled switch is switched on is the occurrence of inrush currents (current spikes), just after that the load current is switched on. One of the reasons for these current spikes is that in the case of a cold-start the floor and thus also the resistive heat elements are cold and have a low electrical resistance. This will cause the load current to ramp up fast when the controlled switch is switched on. Such current spikes may damage the heating system or at least overload the power source and cause a threat for the circuit breaker.

Different solutions have been presented in the prior art. A first way to solve the problem of current spikes is to reduce the applied voltage to the resistive heat element during the cold-start. Current spikes will consequently cause less or no harm to the system. The disadvantage of this solution is that it effectively reduces the efficiency of the heating system, i.e., it uses less of the available power to heat up. Previously-reported solutions using a transformer also have the disadvantage that they poorly manage aging of the system.

Another solution that has been presented is conduction angle control in combination with the use of TRIACs as the controlled switch, see also "SCR Power Theory Training Manual" by Chromalox®, pages 14-17. In the first half cycle the conduction angle is set at 1 degree, that is that the controlled switch is only activated during a phase angle between 179 and 180 degrees. In the next half cycle of the AC grid voltage this is set to 2 degrees, in the third half cycle to 3 degrees, and so on. The conduction angle is gradually increased in each cycle to the point that it equals 180 degrees for each half cycle. A disadvantage of this solution is that the cold-start is very slow, i.e., it requires at least 180 half cycles to reach full power. In addition, this solution leads suffers quite a bit from EMI, particularly with conduction angles between 45 degrees and 135 degrees.

In view of the above-described problems there is a need to further develop heating systems and controllers for such heating systems.

SUMMARY OF THE INVENTION

The invention has for its object to remedy or to reduce at least one of the drawbacks of the prior art, or at least provide a useful alternative to prior art.

The object is achieved through features which are specified in the description below and in the claims that follow.

The invention is defined by the independent patent claims. The dependent claims define advantageous embodiments of the invention.

In a first aspect the invention relates to a heating system comprising:

i) at least one resistive heat element; ii) at least two terminals for receiving a grid voltage from a power grid, and iii) a controller for being connected to the terminals for receiving the grid voltage, the controller connected to the at least one resistive heat element and being configured for controlling a load current through the at least one resistive heat element, wherein the controller is configured controlling the load current though the at least one resistive heat element. The heating system is characterised in that the controller comprises a forced-closure forced-opening (FCFO) bidirectional power switch connected in series with the at least one resistive element for controlling the load current that is received from the power grid.

The effects of the features of the heating system in accordance with the invention are as follows. A key feature of the invention is that the controller comprises a FCFO-bidirectional power switch. This constitutes quite a drastic improvement over the existing TRIAC solutions, because TRIACs suffer from some severe drawbacks. A first drawback is that a TRIAC only allows to control conduction angles from a phase angle defined from 180 degrees and down over (at 180 degrees the current is zero). Second, a TRIAC is not an FCFO-bidirectional current switch, but rather a forced-closure naturally-opening (FCNO) type of switch. It is forcedly closed and automatically opens, because the TRIAC will not open until the current is zero. Therefore, the TRIAC only allows for one closure per half cycle. This means that such solution is throwing away a large part of the cycle. Because of these properties of the TRIAC it is mandatory to start from 180 degrees and work downwards. But then the consequence is that the read current through the TRIAC will be a decreasing one when it is "ON" (particularly with low conduction angles). This has the consequence that the precise conduction angle is not found from the start, but it needs to be determined from many cycles (periods) of the signal first. The FCFO bidirectional current switch of the invention, on the other hand, allows for opening and closing the switch at any moment in time, which opens up the possibility for a wide range of much more intelligent switching schemes as also will become apparent from the embodiments of the invention.

Another effect of the invention is that the current for the power source is limited. In addition, the invention allows to use of a smaller circuit breaker (fuse) at the electrical cabinet. In the prior art these circuit breakers are often over-dimensioned in order to be able to go through the cold start without tripping.

Stepping towards an FCFO-bidirectional power switch as the current invention prescribes constitutes an enormous advantage as it opens a whole new source of possibilities for phase control and modulation making much more sophisticated control systems possible, i.e., FCFO-bidirectional power switch allows for as many openings and closings per half cycle as one might desire or reasonably manage to perform. The embodiments described hereinafter clearly illustrate the tremendous possibilities this technical feature provides.

In order to facilitate understanding of the invention one or more expressions are further defined hereinafter.

Throughout this specification the wording "resistive heat element" must be interpreted as any electrical heater element or component (electrical wire, a resistor, etc.) that at least has an electrical resistance. It may have parasitic capacitances or inductances of significance in addition to that, but that is not essential for the operation of the invention. In fact, any non-resistive parasitic impedances may contribute to increased current spikes, and noise, the consequences of which the invention effectively reduces as well.

Throughout this specification the wording "grid voltage" must be interpreted as the voltage that is provided by the power grid, i.e., the voltage that is provided on the terminals in the electrical cabinet (fuse box or fuse cabinet). Typically, this grid voltage is somewhere between 220V and 240V or between 380V and 420V in newer power grids (typically multiphase grids). In some countries (such as the US) it may be between 110V and 120V.

Throughout this specification the wording "load current" must be interpreted as the total current that is flowing through the (resistive) heat elements connected to the controller. In the heating system as illustrated in the drawings this current is determined by the total current drawn by all the heat modules and the junction box together. The junction box typically places all heat elements (of the heat modules) in parallel such that all heat modules effectively receive the same grid voltage. However, the heat elements may be placed in series as well, such that the resistances of the series are summed up. Or it may be a combination of parallel and serial connections of resistive elements. All of this is determined by the junction box.

Throughout this specification the wording "forced-closure forced-opening (FCFO) bidirectional power switch" must be interpreted as a switch which is capable of switching large currents on and off at any time, but also that when the switch is on the current is allowed to flow in both directions through the switch, which is a requirement in case of an alternating current as a consequence of an AC grid voltage. The FCFO bidirectional power switch of the invention allows for opening and closing the switch at any moment in time.

In an embodiment of the heating system according to the invention the FCFO-bidirectional power switch is for controlling of the load current in a binary way, includes a closed state, wherein the FCFO-bidirectional power switch allows load current to flow in both directions and an open state, wherein the FCFO-bidirectional power switch blocks the load current. Binary control of a FCFO-bidirectional power switch in accordance with this embodiment is very advantageous particularly in combination with embodiments discussed hereinafter.

In an embodiment of the heating system according to the invention the FCFO-bidirectional power switch is a Solid-State Relay comprising power MOSFETs. A Solid-Stage Relay (SSR) comprising power MOSFETs forms an advantageous alternative to the electromechanical switch such as a relay. A great advantage of the SSR with MOSFETs is that they can be switched much faster and are not prone to wear, because of the absence of moving parts. Another advantage is that less current and voltage is needed for SSRs to control high-voltage AC loads. This is particularly true for the operating frequencies of the current application, which are relatively low, namely in the range of 0-1000 Hz. MOSFET power consumption is linked to switching frequency. The MOSFET starts to find its limits in power electronics at frequencies around 1 MHz and is therefore generally operated in the range from 100 kHz-1 MHz in other applications.

In a first variant of this embodiment the power MOSFETs comprise two power MOSFESTs of the N-channel type mounted source-to-source. The design of the SSR here uses two N-channel MOSFET topologies serving different functions. One function is to perform the switching. By using the two MOSFETs both positive and negative current are allowed to flow during the ON time. During the OFF time the body diodes block the current flow because the top and body diodes become reverse biased. More details are given in the detailed description.

In a second variant of this embodiment the power MOSFETs comprise two power MOSFETs of the P-channel type mounted source-to-source. This design of the SSR is in fact analogous to the N-channel version. More details are given in the detailed description.

In an embodiment of the heating system according to the invention the controller further comprises a bidirectional power switch driver connected to the FCFO-bidirectional power switch for driving the power MOSFETs with a driving signal. Power MOSFETs are known to have a large parasitic capacitance, which forms an electrical load for the controller of the switch. This embodiment ensures that this load is driven by the bidirectional power switch driver, which on its turn allows to load or unload in a short time the charge of electrons, which increases the transition from OFF to ON and ON to OFF.

In an embodiment of the heating system according to the invention the controller further comprises a digital processing unit for controlling the FCFO-bidirectional power switch by a control signal. Providing the digital processing unit (digital processor, GPU or CPU) for controlling the FCFO-bidirectional power switch (or the bidirectional power switch driver in case that circuit is used for driving the FCFO-bidirectional power switch) opens up the possibility to program the way the FCFO-bidirectional power switch is controlled, i.e., opened and closed, in accordance with predetermined algorithms.

In an embodiment of the heating system according to the invention the controller further comprises a power monitoring module connected to the at least one resistive heat element for measuring the load current and for providing this information to the digital processing unit including detection of zero-crossings. A power monitoring module provides a convenient way of measuring actual values of the load current, but also other events, parameters and values if necessary, such as the zero-crossings of the grid voltage. This information may then be conveniently provided to the digital processing unit.

In an embodiment of the heating system according to the invention the digital processing unit is configured for controlling the load current in accordance with at least two operational modes. The advantage of having the possibility of the digital processing unit to switch between multiple operational modes, is that that operational mode may be chosen, which best fits the circumstances and requirements, i.e., one operational mode for starting up and another operational mode for normal operation.

In an embodiment of the heating system according to the invention a first mode of the at least two operational modes is a cold-start mode. It is the cold-start, which is often the most challenging to handle. That is the mode, wherein the invention conveniently provides solutions for the earlier-discussed problems of the prior art.

In an embodiment of the heating system according to the invention a second mode of the at least two operational modes is a synchronous mode or a non-regulated mode. Once the heating system has reached its steady-stage temperature, it may either switch to a synchronous regulated mode or to a non-regulated mode, depending on the circumstances and requirements.

In an embodiment of the heating system according to the invention, in the cold-start mode, the controller causes the FCFO-bidirectional power switch to block the load current during a phase angle interval where an absolute value of the load current would be equal to or higher than a predefined current threshold unless a start of the phase angle interval comes later than a predefined phase angle threshold. This embodiment provides for a self-regulating adaptive control of the load current, which the prior art solutions did not show.

Throughout this specification the wording "phase angle" indicates a position on a periodic waveform, wherein the respective phase angles at zero-crossing in a sinusoidal signal are 0°, 180° and 360°, respectively. One might also say that the phase angle is the angle of the grid voltage vector. It must be noted however that in the example embodiments of the algorithm the phase angle is set to 0° at each zero-crossing of the signal, which means that the phase angle runs from 0° to 180° only and then starts over again.

Throughout this specification the wording "phase angle interval" must be interpreted as a period between two phase angles within a half cycle of a sinusoidal signal, wherein the FCFO-bidirectional power switch switches the load current off.

In an embodiment of the heating system according to the invention the controller switches to the second mode when the start of the phase angle interval comes later than the predefined phase angle threshold or when the phase angle threshold is reached before the current threshold is reached at larger phase angles of the signal. The inventor realized that cold-start mode is no longer required at larger phase angles. The reason for this is that if the phase angle is large at a certain value of the load current (still below the current threshold), the slope of the current signal is low, which automatically implies that the maximum load current will no longer be a problem. In addition, the inventor realized that switching of the current at larger phase angles may increase the EMI, which is in this embodiment conveniently solved by switching form asynchronous mode (cold-start) to synchronous or non-regulated mode. In addition, this embodiment allows for convenient automatic switching of the controller between the first mode and the second mode, i.e., it provides an "escape" for the algorithm. More details are given in the detailed description of the drawings.

In an embodiment of the heating system according to the invention the controller in the first mode is configured for carrying out the method in accordance with the third aspect of the invention. The inventor developed a convenient algorithm, which, when run on the digital processing unit, carries out the cold-start method in accordance with the previous embodiment. This method may also be used outside the technical field of floor heating systems.

In a second aspect the invention relates to the controller of the heating system of the invention. It must be noted that embodiments of the invention as defined by the claims comprise a controller which controls the load current through the resistive elements in a new way. It may be sold as a separate module for the heating system of the invention and therefore the applicant is entitled to a claim directed to this entity as well.

In a third aspect the invention relates to a method of controlling a load current in a resistive load with a FCFO-bidirectional power switch in a heating system that is connected to an alternating grid voltage, wherein the FCFO-bidirectional power switch is controlled in a binary way, which includes a closed state, wherein the FCFO-bidirectional power switch allows load current to flow in both directions and an open state, wherein the FCFO-bidirectional power switch blocks the load current. The method comprises steps of:

a) starting a cold-start mode;
b) setting a current threshold and a phase angle threshold;
c) detecting a zero-crossing of the grid voltage and setting an actual phase angle to zero at this point;
d) if not already switched on then switching on the FCFO-bidirectional power switch for allowing load current to flow through the resistive load;
e) measuring an actual load current through the resistive load;
f) determining an actual phase angle of the grid voltage;
g) comparing an absolute value of the actual load current with the current threshold and if the actual load current is larger than or equal to the current threshold then going to step h), otherwise going to step j);
h) switching off the FCFO-bidirectional power switch and storing the actual phase angle as a phase interval start value;
i) comparing the phase interval start value with the phase angle threshold and if the phase interval start value is larger than the phase angle threshold then going to step o), otherwise going to step k);
j) comparing the actual phase angle with the phase angle threshold and if the actual phase angle is larger than or equal to the phase angle threshold then going to step o), otherwise going to step f);
k) determining the actual phase angle;
l) comparing the actual phase angle with a value equalling pi minus the phase interval start value and if this value is reached going to step m), otherwise going to step k);
m) switching on the FCFO-bidirectional power switch for allowing load current to flow through the resistive load;
n) repeating from step c);
o) stopping the cold-start mode and optionally switching to a second mode.

In an embodiment of the method of the invention, the current threshold could be chosen equal to the nominal value of the circuit breaker at a phase angle threshold of 45 degrees, π/4. This closely corresponds to the maximum grid current the circuit breaker (fuse) will face to for long time durations when only one controller is connected to it. Notwithstanding this embodiment, the current threshold may be chosen between zero and this root-mean-square value times the square root of 2 of the circuit breaker.

Preferably, in the previous embodiment, the phase angle threshold is chosen between 30 degrees and 60 degrees, and preferably between 40 degrees and 50 degrees, and even more preferably between 43 degrees and 47 degrees. However, any point with coordinates (I_th, a_th) at the intersection of the circuit breaker characteristics are possible coordinates, which may be used as useful thresholds to trigger switching between the first mode and the second mode.

In a fourth aspect the invention relates to non-transitory computer-readable medium encoded with instructions that, when executed by a control unit, cause the control unit (or processor) to execute the method according of the invention. The method of the invention may be implemented in software which runs on a processer or control unit.

BRIEF INTRODUCTION OF THE FIGURES

In the following is described examples of embodiments illustrated in the accompanying figures, wherein:

FIG. 1 discloses a heat module arrangement wherein the current invention may be used;

FIG. 2 discloses an embodiment of the heat module in FIG. 1 in an exploded view;

Figure 5A:
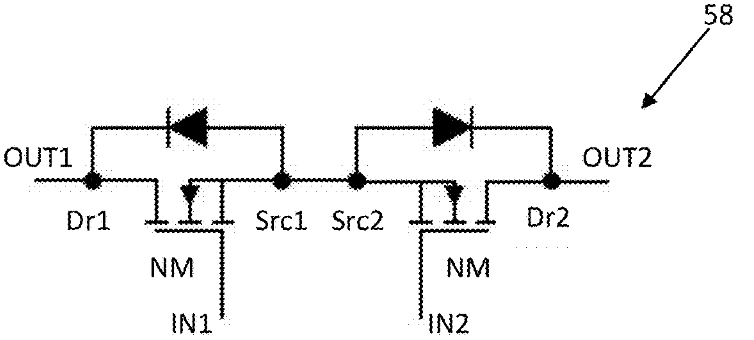
Fig. 5a (PRIOR ART)
Figure 5B:
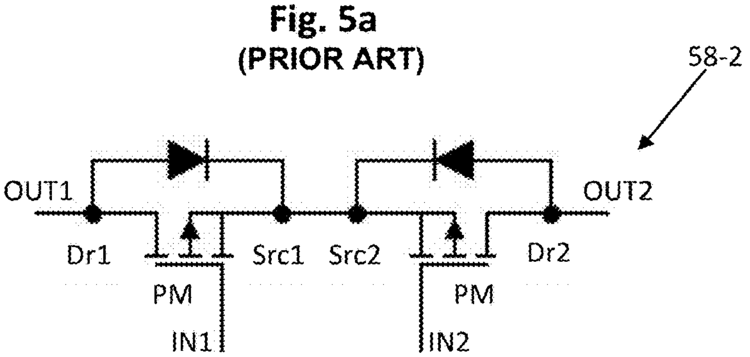
Fig. 5b (PRIOR ART)
Figure 6:
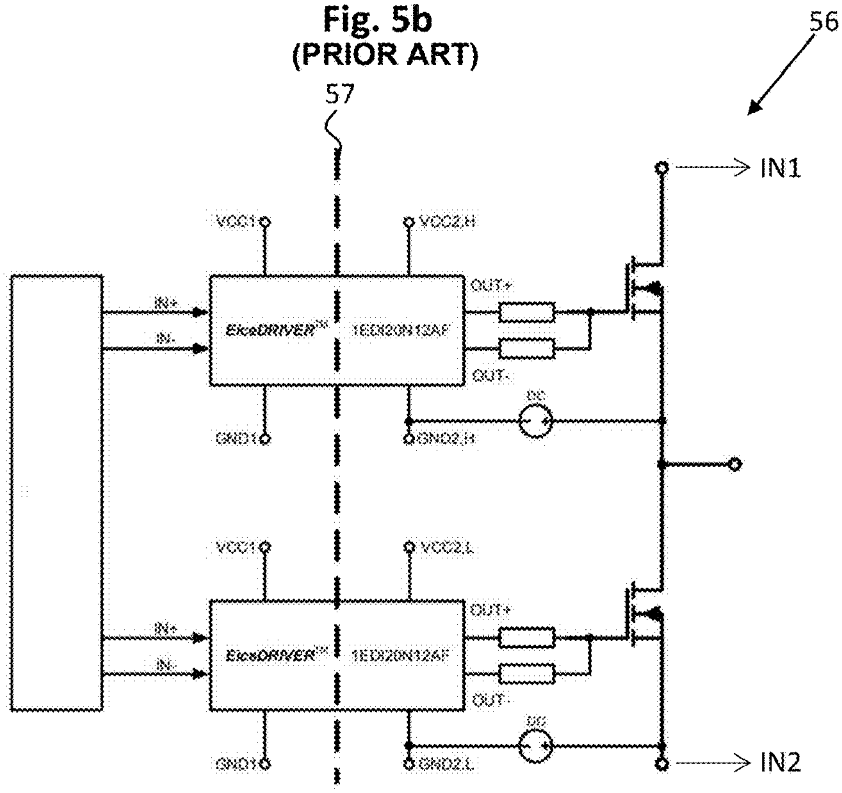
Fig. 6 (PRIOR ART)
Figure 7:
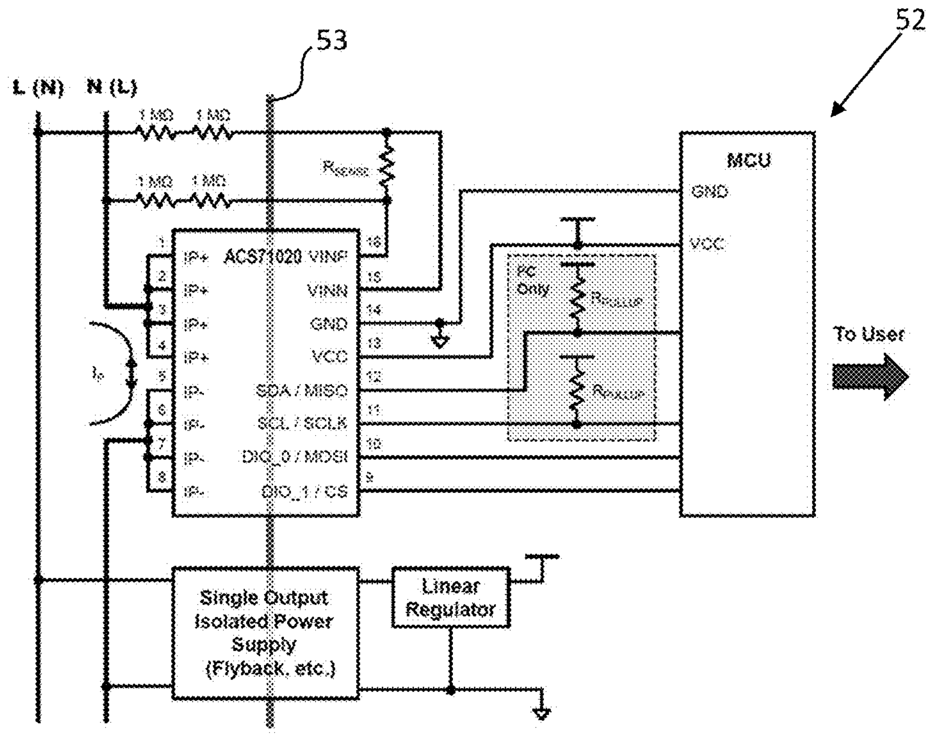
Fig. 7 (PRIOR ART)
Figure 8:
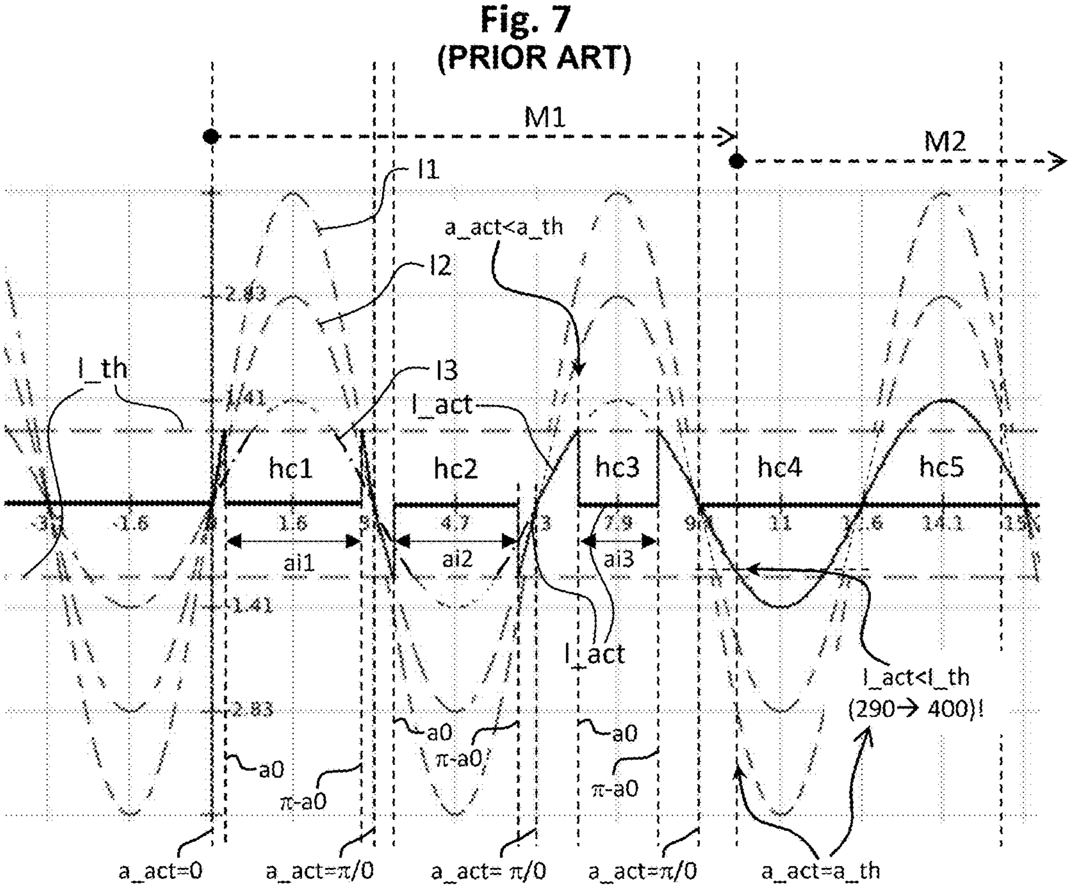
Figure 9:
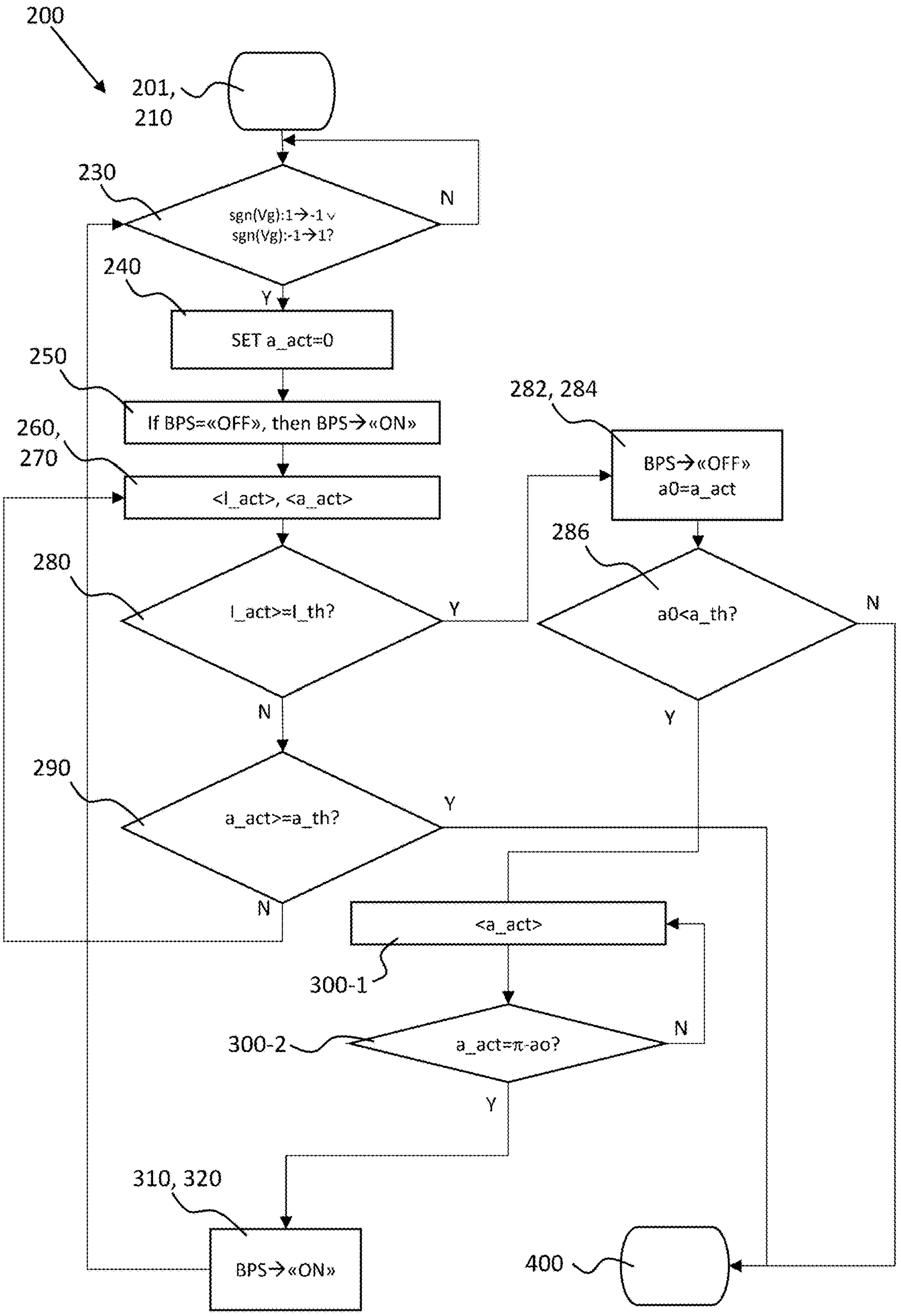
Figure 10:
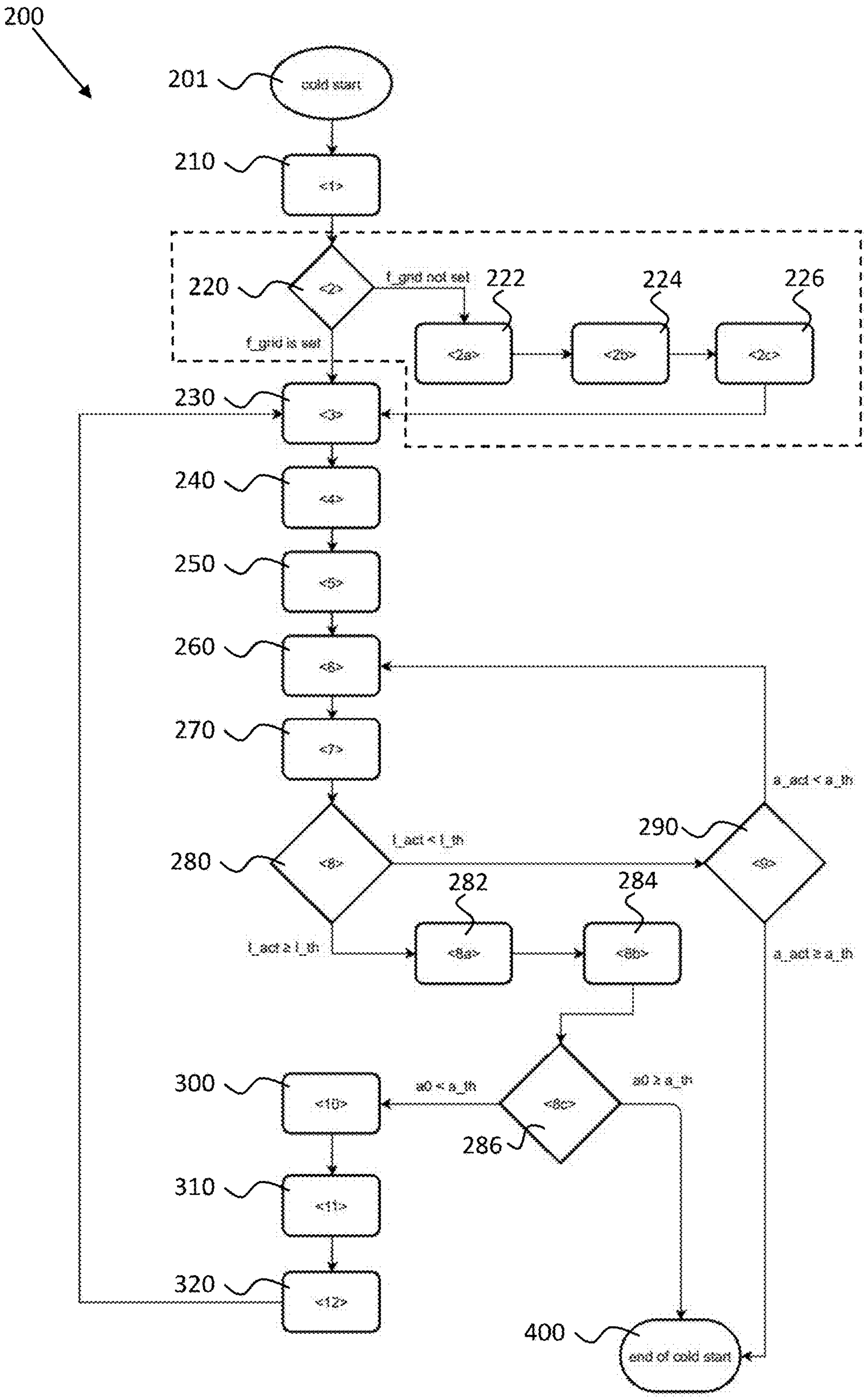

FIG. 5*a* shows a first embodiment of a FCFO-bidirectional power switch, which can be used in the controller of the invention;

FIG. 5*b* shows a second embodiment of a FCFO-bidirectional power switch, which can be used in the controller of the invention;

FIG. 6 shows an example of a FCFO-bidirectional power switch driver, which can be used in the controller of the invention;

FIG. 7 shows an example of a power monitoring module, which can be used in the heating system of the invention;

FIG. 8 illustrates very important aspects of the current invention, in particular the cold-start mode of the heating system of the invention;

FIG. 9 shows a cold-start algorithm in accordance with an embodiment of the method of the invention, and FIG. 10 shows a further embodiment of the method of the invention.

DETAILED DESCRIPTION OF THE EMBODIMENTS

Various illustrative embodiments of the present subject matter are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The present subject matter will now be described with reference to the attached figures. Various systems, structures and devices are schematically depicted in the figures for purposes of explanation only and to not obscure the present disclosure with details that are well known to those skilled in the art. Nevertheless, the attached figures are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

The purpose of this description is to provide more detailed input on circuitry and an algorithm for an optimized way to control a resistive load like a heater element, during its cold-start and transitioning to normal operation. The focus is on delivering criteria such as algorithm efficiency, that is to shorten the cold-start period, limit the EMI, and limit the drawn current. A further purpose is to provide power efficient circuitry to shorten the cold-start and limit the power loss, current consumption limitation and low electromagnetic interferences.

The focus in the given embodiments is on both TN- and IT-grids. IT grids typically have "Live1", "Live2" and "Earth/Ground" terminals. TN-grids typically have "Live", "Neutral", and "Earth/Ground" terminals. In the case of a TN-grid a safety switch on the Neutral line may be dispensed with as this line does not carry a voltage.

IT-grids represent roughly 90% of the grids found on ships and offshore platforms. However, the invention is not limited to these two grid types and is equally applicable to other grid types, as long as they provide AC grid voltage.

The invention will be discussed in more detail with reference to the figures. The figures will be mainly discussed in as far as they differ from previous figures.

Figure 1:
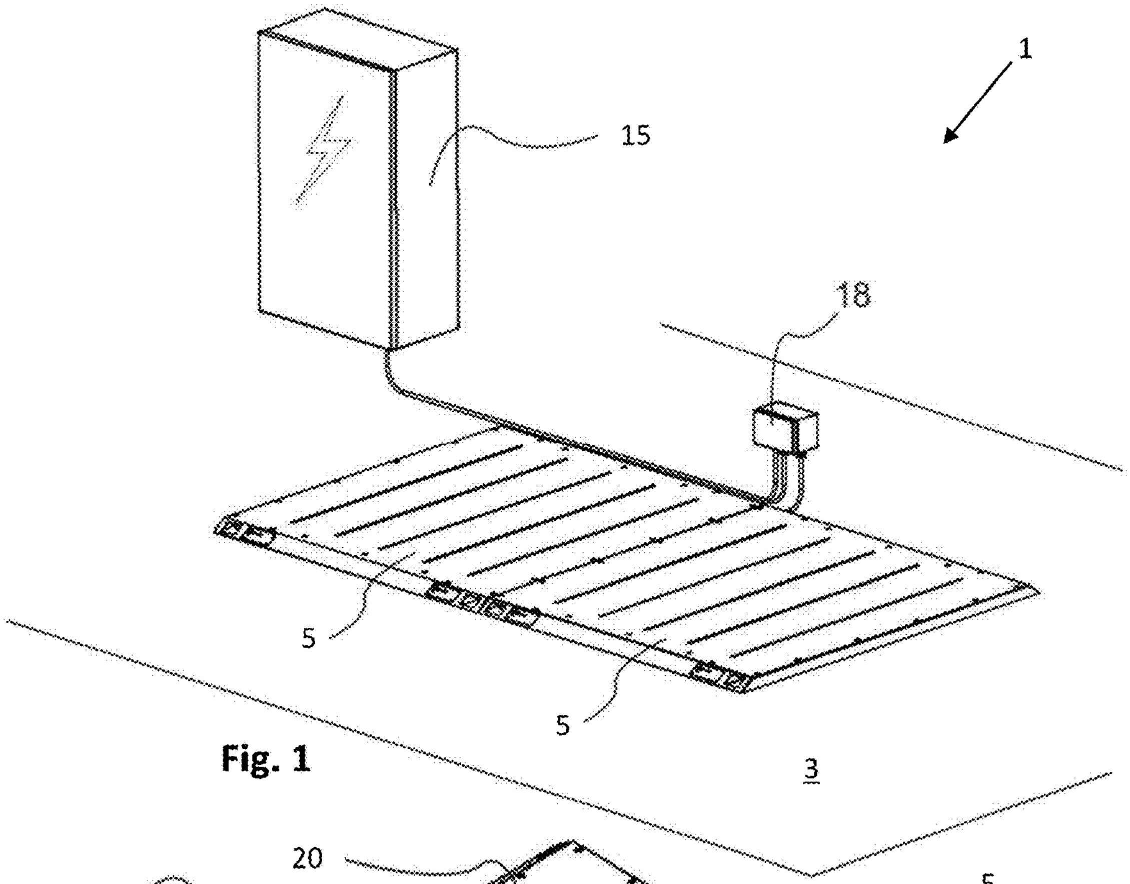

FIG. 1 discloses a heat module arrangement 1 wherein the current invention may be used. The heat module arrangement 1 is configured to be arranged on or in a flooring 3. The heat module arrangement 1 comprises a heat module device comprising two or more heat modules 5, each comprising at least one heat element 10 (visible in FIG. 2), and an electrical cabinet 15 (referred to as electric power source in non-prepublished patent application Ser. No. 20/191,312) connected to the at least one heat element 10. The heat module arrangement 1 further comprises a junction box 18 connecting the heat elements 10 of the heat modules 5. In FIG. 1 two heat modules 5 are shown. However, it shall be understood that further heat modules 5 may be connected correspondingly.

Figure 2:
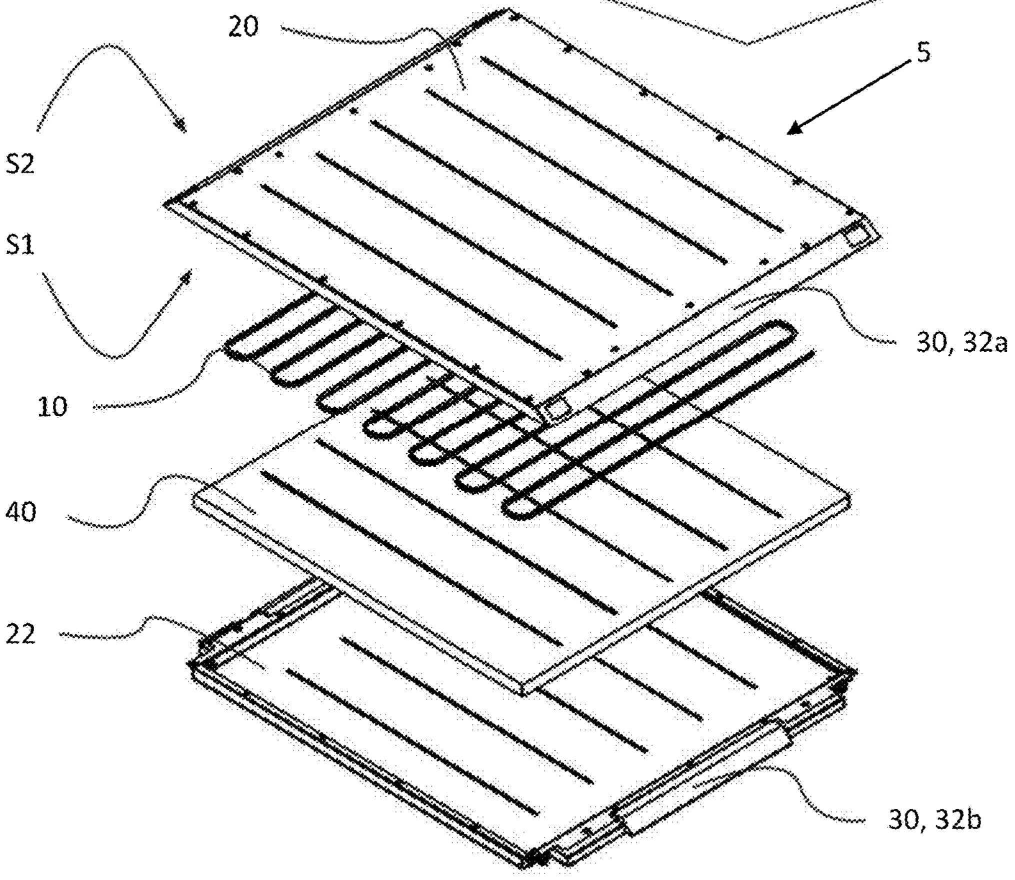

In FIG. 2 an embodiment of one of the heat modules 5 from FIG. 1 is disclosed in an exploded view. The heat module 5 comprises a stepping plate 20 and a base plate 22. The stepping plate 20 comprises a first side S1 and second side S2. The at least one heat element 10 is attached to the first side S1 of the stepping plate 20 so that the emitted heat is directly conducted to the stepping plate 20. The second side S2 of the stepping plate 20 is configured to be stepped on by a person.

The heat modules 5 further comprises a connection member 30 configured to connect the stepping plate 20 and the base plate 22 and hold them separated from each other, thereby forming a spacing. The connection member 30 further has the function of isolating the spacing from the surrounding environment. The connection member 30 may comprise a first portion 32*a* at the stepping plate 20 and a second portion 32*b* at the base plate 22. The first portion 32*a* and the second portion 32*b* are configured to jointly connect the stepping plate 20 and the base plate 22.

The stepping plate 20 may comprise an anti-slip layer at the second side S2.

The heat modules 5 in FIG. 1 further comprises a water impermeable insulator 40 arranged so that the at least one heat element 10 is isolated from the surrounding environment. The insulator 40 is for example an epoxy-foam or a polyurethane-foam. The insulator 40 may be arranged filling said spacing to more than 99.5%. In addition to isolating the heat element 10 from the surrounding environment, and directing the heat to the stepping plate 20, in certain implementations where the insulator is epoxy-foam or polyurethane-foam, also adds significant structural strength to the heat modules 5.

The stepping plate 20 comprises for example aluminium and has a wall thickness in an interwall between 0.5 and 3 mm. Preferably, the stepping plate 20 has been processed by a rolling rib. By preparing the stepping plate 20 by means of such a rolling rib, it becomes possible to provide the stepping plate 20 with a very low thickness, considerably reducing the weight of the heat module 5.

The at least one heat element 10 is preferably attached to the stepping plate 20 by means of one of an adhesive tape, such as aluminium tape, a glue connection, such as heat transferring glue, and a bolt connection. Alternatively, the heat modules 5 comprises at least one further connection member 42 for connecting the at least one heat element 10 to the stepping plate 20. The at least one further connection member 42 is attached to the stepping plate 20 or coextruded with the stepping plate 20. See FIG. 3*e*.

The base plate 22 mainly comprises a rigid structural material, such as a metal plate or extruded epoxy.

The at least one heat element 10 preferably comprises an electric self-regulating heating cable. The electric self-regulating heating cable enables the temperature to be regulated to a predetermined temperature or a predetermined temperature interval. Alternatively, the at least one heat element 10 comprises an electric heating cable, a heat mat, or a heating paint.

The heat module 5 comprises connection means, such as a bolt connection or a magnet connection, for connecting the heat module 5 to the flooring 3. Alternatively, the heat module 5 may comprise one or more legs for holding the heat module 5 elevated from the flooring 3.

More information about the heat module arrangement 1 can be found in non-prepublished patent application NO20191312. The current invention deals with the aspect of steering (controlling current through) the heat module arrangement 1. The at least one heat element 10 of the heat module arrangement 1, just like many other types of heating modules, forms together with the junction box 18 at least form a resistive load for the electrical cabinet 15.

When such heating modules 5 are switched on different kinds of problems may occur. And that is where the current invention provides a solution.

As discussed in the introduction, the primary feature of the invention is about the FCFO-bidirectional power switch, opening up a load of new possibilities. The embodiments discussed hereinafter are focussing in more detail on these possibilities.

Figure 3:
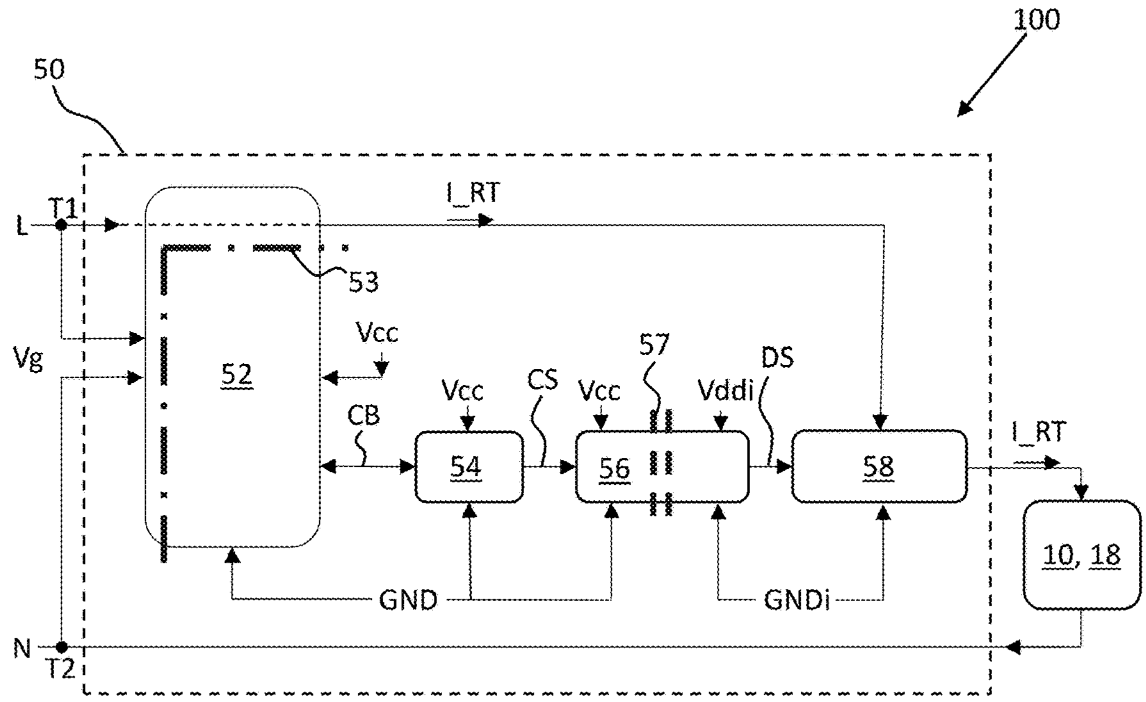
FIG. 3 shows a high-level schematic view of a first embodiment of the heating system according to the invention.

FIG. 3 shows a high-level schematic view of a first embodiment of the heating system 100 according to the invention. The figure shows a power grid, which is a TN-grid, i.e., it as a phase line (or live line) L carrying an AC-voltage signal having the full amplitude and a neutral line N carrying no signal. This results in a grid voltage Vg having the full swing. The main blocks of the heating system 100 are a controller 50 connected with the resistive load, which comprises at least one heat element 10, but also a junction box 18 as previously discussed. It is not so important how this impedance is built up as long as it has a resistive component. The controller 50 has a first terminal T1 and a second terminal T2 that are connected with the phase line L and the neutral line N of the power grid, respectively. The resistive heat element 10, 18 is connected between an output of the controller 50 and the neutral line N as illustrated. The controller 50 controls the load current I_RT through the resistive heat element, which obviously is drawn from the power grid. It is assumed that the controller itself will hardly consume any power. Expressed differently, its contribution to the total power consumption can be ignored compared to the power consumption in the heating elements 10). Hence, the actual current drawn from the power grid is substantially equal to the load current drawn by the electrical load 10. In the current embodiment the controller 50 comprises of multiple blocks. The controller 50 comprises a power monitoring module 52, which measures and monitors the current I_RT delivered to the resistive load 10. The power monitoring module 52 delivers this information digitally to a digital processing unit 54 via a communication bus CB. The digital processing unit 54 is coupled with an output to an input of a FCFO-bidirectional power switch driver 56, the output carrying a control signal CS as illustrated. The FCFO-bidirectional power switch driver 56 delivers a driving signal DS to a FCFO-bidirectional power switch 58. In order for the heating system 100 to work properly galvanic isolation 57 is required, particularly in the FCFO-bidirectional power switch driver 56. This means that a galvanically isolated DC-supply voltage Vddi is required at an output side of the FCFO-bidirectional power switch driver 56. Also, the isolation requires an isolated ground GNDi. This isolated voltages GNDi, Vddi are created in separate voltage generators/separators (not shown) such as isolated DC-DC converters. The remaining (parts of) the blocks may be provided with a normal DC-supply voltage Vcc and ground GND as illustrated. The power monitoring module 52 also preferably comprises reinforced isolation 53 for electrically isolating/shielding. It must be noted that everything related to isolation in the current embodiment is purely done from a safety perspective in a practical implementation using existing electronic components. However, the invention is by no means limited to such solutions.

Figure 4:
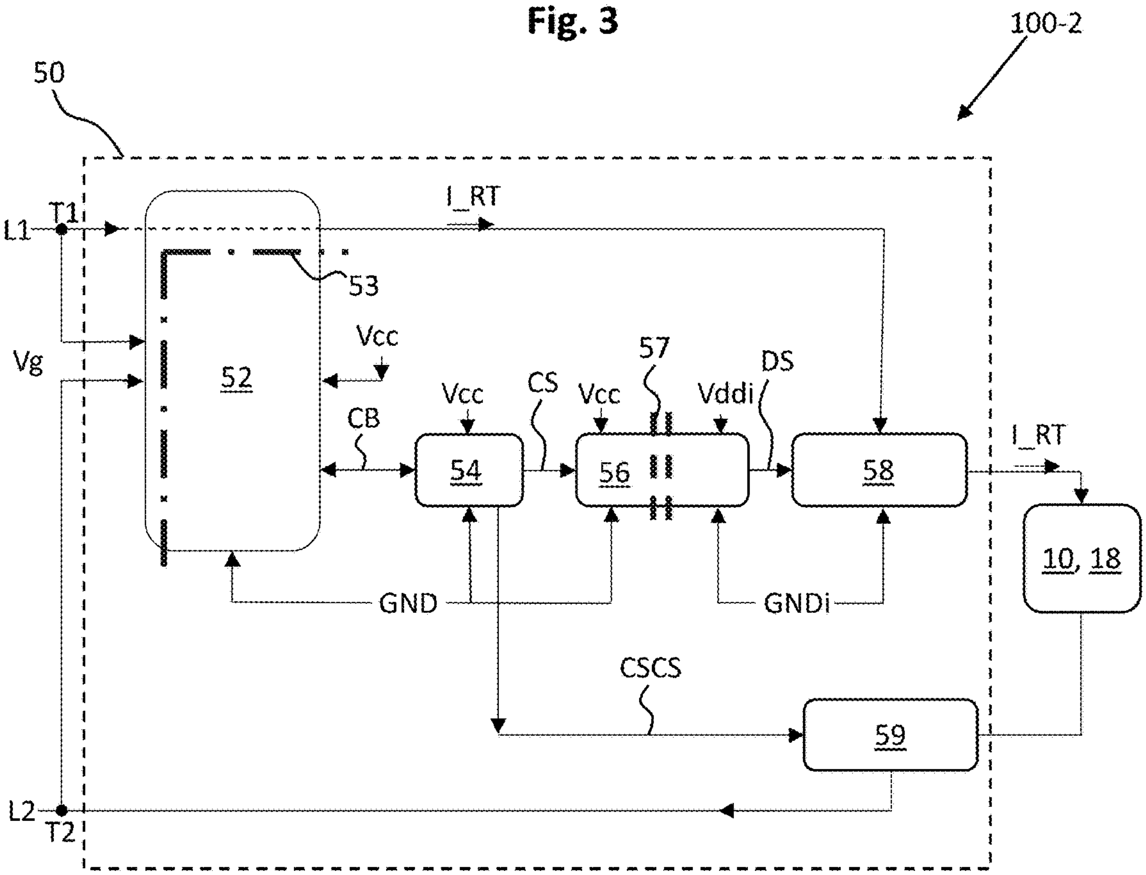
FIG. 4 shows a high-level schematic view of a second embodiment of the heating system according to the invention.

FIG. 4 shows a high-level schematic view of a second embodiment of the heating system 100-2 according to the invention. The figure shows a power grid, which is an IT-grid, having a first phase line L1 carrying an AC-voltage signal and a second phase line L2 carrying an AC-voltage signal. The resulting swing of the grid voltage Vg is effectively the same as in FIG. 3. This embodiment of the heating system 100-2 will only be discussed in as far as it deviates from FIG. 3. The main difference is that this heating system 100-2 comprises an extra safety measure in the form of an electro-mechanically controlled switch 59 that is connected with one terminal to the second phase line L2 in series with the resistive load 10, 18. The electro-mechanically controlled switch 59 (such as a relay) is controlled by the digital processing unit 54, which generates a controlled switch control signal CSCS for the electro-mechanically controlled switch 59. A main function of this mechanically controlled switch 59 is to be able to completely deactivate the heating system 100-2 when not being used, that is that no voltage is present over the resistive heat elements 10, 18. Without the electro-mechanically controlled switch 59 the voltage signal on the neutral line N may be transferred to the resistive heat elements 10, 18, which forms a safety hazard for people working on the heating system. The relay could be replaced with an SSR or SCR combination or a TRIAC.

FIG. 5*a* shows a first embodiment of a FCFO-bidirectional power switch 58, which can be used in the controller 50 of the invention. This figure shows a Solid-State Relay circuit having two N-channel type power MOSFETs NM connected with their respective sources Src1, Src2 together, i.e., back-to-back. The inputs IN1, IN2 of the two MOSFETs NM are to be driven with the same gate signal, wherein a high voltage causes the switch 58 to be closed and a low voltage causes the switch 58 to be open. The outputs OUT1, OUT2 of the switch 58 are defined by respective drains Dr1, Dr2 as illustrated. When closed the switch 58 will allow current to flow in both directions through the MOSFETs NM. This is the reason the switch is called a bidirectional power switch.

FIG. 5*b* shows a second embodiment of a FCFO-bidirectional power switch 58-2, which can be used in the controller 50 of the invention. This figure shows a Solid-State Relay circuit having two P-channel type power MOSFETs PM connected with their respective sources Src1, Src2 together, i.e., back-to-back. The inputs IN1, IN2 of the two MOSFETs PM are to be driven with the same gate signal, wherein a low voltage causes the switch 58-2 to be closed and a high voltage causes the switch 58-2 to be open. The outputs OUT1, OUT2 of the switch 58-2 are defined by respective drains Dr1, Dr2 as illustrated. When closed the switch 58-2 will allow current to flow in both directions through the MOSFETs PM. The inversion of the response to gate signals will have to be accounted for in the control signal CS generated by the digital processing unit.

The FCFO-bidirectional power switches of FIGS. 5*a* and 5*b* are available components from Texas Instruments and other semiconductor manufacturers. More information about these components can be found in:

SLVA948-December 2017 *"Achieve Bidirectional Control and Protection Through Back-to-Back Connected eFuse Devices" pp:* 2-3.

FIG. 6 shows an example of a bidirectional power switch driver 56, which can be used in the controller 50 of the invention. There are many components available on the market, which may be used. This figure shows just one example, which is available from Infineon. It concerns the 1EDI EiceDriver™ Compact 1EDI20N12AF. It features the earlier discussed galvanic isolation 57 and is capable of driving the large gate capacitances on the inputs IN1, IN2 of the power MOSFETs of the FCFO-bidirectional power switch 50. As it is just a gate driver, its function is not discussed in detail here.

For the digital processing unit 54 in FIGS. 3 and 4 there are many alternative available, such as a microcontroller, a microprocessor with its peripheral circuitry, a digital signal processor (DSP) or a field-programmable gate array (FPGA). As long as the chosen digital processing unit 54 can be programmed it will be capable of carrying out methods (algorithms) for controlling the FCFO-bidirectional power switch 58 of the invention in accordance with a program or set of instructions. Alternatively, the method (algorithm) may be implemented on an application-specific integrated circuit (ASIC) as well. This is a choice of a designer when implementing the invention.

FIG. 7 shows an example of a power-monitoring module 52, which can be used in the heating system 100, 100-2 of the invention. There are many components available on the market, which may be used. This figure shows just one example which may be used, which is available from Allegro Microsystems. It concerns the "ACS71020 Single Phase Isolated, AC Power Monitoring IC with Voltage Zero Crossing and Overcurrent Detection". It features the earlier discussed reinforced isolation 73. The figure shows how the chipset is 17urrcted to the phase line L and neutral line N (polarity not important). A major function of the chipset that is used is its zero-crossing detection capability, which may be conveniently used in the algorithm of the invention as will be discussed later. As an alternative to monitoring power (where the current is obtained by dividing the power by the voltage) one might monitor the current directly.

FIG. 8 illustrates very important aspects of the current invention, in particular the cold-start mode M1 of the heating system 100, 100-2 of the invention. This figure will be first briefly explained and subsequently in more detail when discussing FIG. 9. The figure illustrates the current in a transition from an OFF-state to a cold-start mode M1, and subsequently from the cold-start mode M1 into a second mode M2, which is a synchronous mode in this example. The figure shows how an actual load current I_act varies over time during these consecutive different modes. It must be stressed that the drawing is purely for illustration purposes and may in practise deviate a lot from what is shown, in particular as regards the number cycles and half cycles in cold-start mode M1. In the current example there are slightly more than three half cycles hc1, hc2, hc3 in the cold-start mode M1 and about two half-cycles hc4, hc5 in the synchronous mode M2. The transition between the cold-start mode M1 and the synchronous mode M2 does not exactly coincide with a cycle transition (from hc3 to hc4) for reasons that will be explained with reference to FIG. 9.

FIG. 8 shows three sinusoidal current curves I1, I2, I3 which each represent what the actual load current I_act would be based upon the grid voltage Vg and the actual value of the resistance of the resistive load 10, 18, when we consider that there would be no limitations on the current carrying capacity of the resistive load 10, 18 when considered in a steady-state situation. The first curve I1 with the highest amplitude represents the current signal with the lowest resistance value of the resistive load 10, 18, which is typical when the resistive heat element 10 is cold, i.e., lower temperature generally results in a lower resistance. The second curve I2 with a lower amplitude than the first represents the current signal with a medium resistance value of the resistive load 10, 18, which may occur when the temperature of the heat element 10 has already increased. The third curve I3 with the lowest amplitude represents the current signal with the highest temperature of the heat element 10.

The essence of the algorithm in accordance with some embodiments of the invention is that it needs to ensure that the controller 50 (FIG. 3) causes the FCFO-bidirectional power switch 58, BPS (FIG. 3) to block the load current I_RT, I_act (FIGS. 3+8) during a phase angle interval ai1, ai2, ai3 (FIG. 3) where an absolute value of the load current I1, I2, I3 (FIG. 8) would be equal to or higher than a predefined current threshold I_th (FIG. 8) unless a start of the phase angle interval a0 (FIG. 8) comes later than a predefined phase angle threshold a_th (FIG. 8). The resulting phase angle intervals ai1, ai2, ai3 and their respective lengths extending between the start a0 of the phase interval ai1, ai2, ai3 and the end I-a0 are clearly illustrated in FIG. 8. Here it must be stressed that the actual phase angle a_act is set on zero at each zero-crossing of the current signal, as illustrated in FIG. 8.

In an embodiment of the method the controller 50 switches to the second mode M2 when the start of the phase angle interval a0 is larger than the predefined phase angle threshold a_th or when the phase angle threshold a_th is reached before the current threshold I_th is reached.

It will be understood that there are many ways of implementing such methods, i.e., different algorithms may be developed, which have the same or similar result. In FIGS. 9 and 10 two different implementations are discussed. However, the invention is not limited to these specific implementations.

FIG. 9 shows a cold-start algorithm in accordance with an embodiment of the method 200 of the invention. The method concerns a method of controlling a load current I_act in a resistive load 10, 18 with a FCFO-bidirectional power switch 58, 58-2, BPS in a heating system 100, 100-2 that is connected to an alternating grid voltage Vg, wherein the FCFO-bidirectional power switch 58, 58-2, BPS is controlled in a binary way, which includes an closed state, wherein the FCFO-bidirectional power switch 58, 58-2, BPS allows load current I_RT to flow in both directions and an open state, wherein the FCFO-bidirectional power switch 58, 58-2, BPS blocks the load current I_RT. Even though the focus on heating systems, the method may be used in different application areas.

The method represents an algorithm which comprises the following steps: In a first step 201 (step a) the cold-start mode M1 is started. This generally happens when a system is switched on when for the first time or after some idle time. The cold-start mode M1 represents a so-called asynchronous mode as already discussed.

In a second step 210 (step b) the current threshold I_th and phase angle threshold a_th are set or determined. These threshold values may obviously have been set before the method is carried out. What is important, however, is that these values are available when the method is carried out.

In a third step 230, 240 (step c) a zero-crossing of the grid voltage Vg is detected and an actual phase angle a_act is set to zero at this point. Here it must be noted that the actual current I_act may not necessarily make a zero-crossing at start-up as the current is most likely zero before start-up. Hence, it is the grid voltage Vg that needs to be monitored for zero-crossings.

In a fourth step 250 (step d) the FCFO-bidirectional power switch (58, BPS) is switched on, if not already switched on, for allowing load current I_act to flow through the resistive load (10, 18). From this moment the actual load current I_act will follow a respective current curve I1, I2, I3 depending on the temperature and associated resistance of the resistive load (10, 18).

In a fifth step 260 (step e) the actual load current I_act through the resistive load 10, 18 is measured. This feature is key to making the algorithm adaptive and self-regulating. The prior art solutions do not show such feature.

In a sixth step 270 (step f) the actual phase angle a_act of the grid voltage Vg is determined. There are different ways of doing this, one of them is discussed in view of FIG. 10.

In a seventh step 280 (step g) an absolute value of the actual load current I_act is compared with the current threshold I_th. If the actual load current I_act is larger than or equal to the current threshold I_th then the next step will be step h), otherwise the next step will be step j).

In an eight step 282, 284 (step h) the FCFO-bidirectional power switch 58, BPS is switched off and the actual phase angle a_act is stored as a phase interval start value a0.

In a ninth step 286 (step i) the phase interval start value a0 is compared with the phase angle threshold a_th. If the phase interval start value a0 is larger than the phase angle threshold a_th then the next step is step o), otherwise the next step is step k).

In a tenth step 290 (step j) the actual phase angle a_act is compared with the phase angle threshold a_th. If the actual phase angle a_act is larger than or equal to the phase angle threshold a_th then the next step is step o), other the next step is step f).

In an eleventh step 300-1 (step k) the actual phase angle a_act is determined.

In a twelfth step 300-2 (step 1) the actual phase angle a_act is compared with a value equalling PI($\pi$) minus the phase interval start value a0. If this value is reached the next step is step m), otherwise the next step is step k).

The eleventh and the twelfth step together effectively form a detection of a predefined phase angle, that is a detection when the actual phase angle equal $\pi$−a0. In other words, the two steps might be combined into a single phase-angle detection step.

In a thirteenth step 310 (step m) the FCFO-bidirectional power switch 58, BPS is switched on for allowing load current I_act to flow through the resistive load 10, 18.

In a fourteenth step 320 (step n) the method is repeated from step c).

In a fifteenth step 400 (step o) the cold-start mode M1 is stopped and optionally it is switched to a second mode M2.

It must be noted that, even though the steps are numbered here above, that this has nothing to do with the total number of steps being carried out in the method. The numbering only serves for referencing purposes.

Considering this algorithm of FIG. 9 following may be noted about FIG. 8. In the first half cycle hc1 the temperature is low, and the actual load current I_act follows the first current curve I1. It then rapidly hits the current threshold I_th as illustrated, where step g) will trigger step h) and switch off the FCFO-bidirectional power switch 58, BPS at step h). The actual load current I_act becomes zero at the phase interval start value a0 (which is determined to be lower than the phase angle threshold a_th in step i) and remains zero up to a phase angle of $\pi$−a0 in the first half cycle hc1 in steps k), l), where the FCFO-bidirectional power switch 58, BPS is switched on in step m). At this point the actual load current I_act will become substantially equal to the first current curve I1 and follow it this signal towards the zero-crossing. Then step n) makes the method go back to step c). At the zero-crossing defined by the transition from the first half cycle hc1 to the second half cycle hc2 the actual phase angle a_act is set to zero in step c).

Now the first half cycle hc1 has caused the temperature of the resistive heat element to rise somewhat, which makes the actual load current I_act follow the second current curve I2 in the second half cycle hc2, as illustrated. It must be noted that this temperature rise may be a gradual effect (and the transition from the first current curve I1 to the second current curve I2 may be smooth) and does not need to occur exactly on the transition from the first half cycle hc1 to the second half cycle hc2. However, for illustration purposes it is shown that way.

The actual load current I_act follows the second current curve I2 in the beginning of the second half cycle hc2 and becomes negative. When an absolute value of the actual load current I_act reaches the current threshold I_th the FCFO-bidirectional power switch 58, BPS is switched off again. The actual load current I_act becomes zero at the phase interval start value a0 (which is larger than the previous half cycle hc1, but still determined to be lower than the phase angle threshold a_th in step i) and remains zero up to a phase angle of π−a0 in the second half cycle hc2 in steps k), l), where the FCFO-bidirectional power switch 58, BPS is switched on in step m). At this point the actual load current I_act will become substantially equal to the second current curve I2 and follow it this signal towards the zero-crossing. Then step n) makes the method go back to step c). At the zero-crossing defined by the transition from the second half cycle hc2 to the third half cycle hc3 the actual phase angle a_act is set to zero in step c).

Now the second half cycle hc2 has caused the temperature of the resistive heat element to rise somewhat, which makes the actual load current I_act follow the third current curve I3 in the third half cycle hc3, as illustrated. It must be noted that this temperature rise may be a gradual effect (and the transition from the second current curve I2 to the third current curve I3 may be smooth) and does not need to occur exactly on the transition from the second half cycle hc2 to the third half cycle hc3. However, for illustration purposes it is shown that way.

The actual load 22urrentt I_act follows the third current curve I3 in the beginning of the third half cycle hc3 and becomes positive. When an absolute value of the actual load current I_act reaches the current threshold I_th the FCFO-bidirectional power switch 58, BPS is switched off again. The actual load current I_act becomes zero at the phase interval start value a0 (which is larger than the previous half cycle hc2, but still determined to be lower than the phase angle threshold a_th in step i) and remains zero up to a phase angle of x-a0 in the third half cycle hc3 in steps k), l), where the FCFO-bidirectional power switch 58, BPS is switched on in step m). At this point the actual load current I_act will become substantially equal to the third current curve I3 and follow it this signal towards the zero-crossing. Then step n) makes the method go back to step c). At the zero-crossing defined by the transition from the third half cycle hc3 to the fourth half cycle hc4 the actual phase angle a_act is set to zero in step c).

Now the third half cycle hc3 in this example has caused the temperature of the resistive heat element reach its steady-state value, which makes the actual load current I_act follow the third current curve I3 in the fourth half cycle hc3, as illustrated. It must be noted that this temperature may in fact be a little bit larger causing the actual load current I_act to actually follow a fourth current curve (not shown) having even lower current values. The consequence of this is that something else happens in the fourth half cycle hc4, namely that the phase angle threshold a_th is reached before the load current threshold I_th. This is illustrated in FIG. 8 and will actually cause the method to go from step j) to step o) causing the FCFO-bidirectional power switch 58, BPS to remain ON and the cold-start mode M1 to transition to the second mode M2. When the load current threshold I_th has been chosen to be the nominal value of the circuit breaker and the phase angle threshold a_th is set around 45 degrees, this will prevent the actual load current I_act to rise above problematic levels causing the circuit breaker (fuse) to interrupt the current.

It must be noted that FIG. 8 pure illustrative. The temperature rising effect may in practise be much slower, causing the actual load current I_act to follow certain current curves many more cycles than illustrated in FIG. 8.

The inventor has discovered that it in a practical example it may take from a few up to a couple of hundred cycles for the cold-start to finish. This number depends on the thermal characteristics of the heater modules 5 and the environmental conditions such as temperature, wind, snow, water, sun exposure and location.

FIG. 10 shows a further embodiment of the method 200-2 of the invention. This embodiment will only be discussed in as far as it differs from FIG. 9. It may not be very easy to directly measure the actual phase angle a_act in the method. Instead, indirect measuring may be preferred, that is that a counter is used, which starts at a zero crossing and as time passes by the counter will increase, thereby giving an indication of the actual phase angle a_act. As the grid frequency fg tends to be constant, all what is required is to calibrate the counter with the period (=1/fg) of the alternating voltage. The embodiment of FIG. 10 provides some flexibility in that incorporates the determination of the grid frequency fg together with calibration of the counter.

Between step b) and c) the following substeps are inserted:

In a first substep 220 it is determined whether the grid frequency fg is known or set. If not known or set the next step will be substep 222, otherwise the next step is step c) as earlier discussed.

In a second substep 222 a zero-crossing is detected, and the timer is started.

In a third substep 224 the timer is stopped after a predefined number of zero-crossings, for example 20 zero-crossings.

In a further substep 226 the grid frequency is calculated from the timer and the predefined number of zero-crossings.

It must be noted that the above-mentioned method of determining the grid frequency may also be carried out before the cold-start or at any other moment. Once done, the grid frequency may be stored in the controller 50.

Now that the grid frequency is known and the relation between the counter and the predefined number of zero-crossings, the counter may be calibrated such that is indirectly indicates the actual phase angle a_act.

In FIG. 9 this implies that step f) and step k) are implemented by determining a value of the counter. And that all phase angle comparisons in step i) and step j) are comparing counter values instead.

With reference to FIG. 8 it is further noted that the grid frequency fg typically lies between 50 and 60 Hertz, which results in a period between 0.0167 s and 0.02 s, and a half cycle between 0.00833 s and 0.01 s.

The algorithms of FIGS. 9 and 10 may be run on a state-machine. For the algorithms of FIGS. 9 and 10 the inventor designed the controller such that the sampling frequency is 1 kHz. However, other sampling frequencies may be used as well.

The particular embodiments disclosed above are illustrative only, as the invention may be modified and practiced in different but equivalent manners apparent to those skilled in the art having the benefit of the teachings herein. For example, instead of the gate driver presented in FIG. 6 a Photovoltaic Coupler for MOSFET driver as provided by Toshiba may be chosen. And there are many other circuits that are suitable.

The person skilled in the art may easily find alternative solutions for the power monitoring module, which may be replaced by a current measurement module as previously discussed. Also, in the embodiments having a relay as a mechanically controlled switch (FIG. 4) the relay may be replaced by a TRIAC or other SCR.

The invention covers all these variants as long as they are covered by the independent claims. No limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage. The invention may be implemented by means of hardware comprising several distinct elements, and by means of a suitably programmed computer. In the device claims enumerating several means, several of these means may be embodied by one and the same item of hardware.

The invention claimed is:

1. A heating system comprising:

at least one resistive heat element;

at least two terminals for receiving a grid voltage from a power grid; and a controller for being connected to the terminals for receiving the grid voltage, the controller connected to the at least one resistive heat element, wherein the controller is configured to control a load current though the at least one resistive heat element, wherein the controller comprises a forced-closure forced-opening bidirectional power switch connected in series with the at least one resistive heat element for controlling the load current that is received from the power grid, wherein the controller further comprises a digital processing unit for controlling the bidirectional power switch by a control signal, wherein the digital processing unit is configured for controlling the load current in accordance with at least two operational modes, wherein a first mode of the at least two operational modes is a cold-start mode, wherein a second mode of the at least two operational modes is a synchronous mode or a non-regulated mode, wherein, in the cold-start mode, the controller causes the bidirectional power switch to block the load current during a phase angle interval wherein an absolute value of the load current would be equal to or higher than a predefined current threshold unless a start of the phase angle interval comes later than a predefined phase angle threshold, and wherein, in the synchronous mode or the non-regulated mode, the controller causes the bidirectional power switch to remain switched on.

2. The heating system according to claim 1, wherein the bidirectional power switch is for controlling of the load current in a binary way, includes a closed state, wherein the bidirectional power switch allows load current to flow in both directions and an open state, wherein the bidirectional power switch blocks the load current.

3. The heating system according to claim 2, wherein the bidirectional power switch is a Solid-State Relay comprising power MOSFETs.

4. The heating system according to claim 3, wherein the controller further comprises a bidirectional power switch driver connected to the bidirectional power switch for driving the power MOSFETs with a driving signal.

5. The heating system according to claim 1, wherein the controller further comprises a power monitoring module connected to the at least one resistive heat element for measuring the load current and for providing this information to the digital processing unit including detection of zero-crossings.

6. The heating system according to claim 1, wherein the controller switches to the second mode when the start of the phase angle interval is larger than the predefined phase angle threshold or when the phase angle threshold is reached before the current threshold is reached.

7. A method of controlling a load current in a resistive load with a bidirectional power switch in a heating system that is connected to an alternating grid voltage, wherein the bidirectional power switch is controlled in a binary way, which includes a closed state, wherein the bidirectional power switch allows load current to flow in both directions and an open state, wherein the bidirectional power switch blocks the load current, the method comprising steps of:

a) starting a cold-start mode;

b) setting a current threshold and a phase angle threshold;

c) detecting a zero-crossing of the grid voltage and setting an actual phase angle to zero at this point;

d) if not already switched on then switching on the bidirectional power switch for allowing load current to flow through the resistive load;

e) measuring an actual load current through the resistive load;

f) determining an actual phase angle of the grid voltage;

g) comparing an absolute value of the actual load current with the current threshold and if the actual load current is larger than or equal to the current threshold then going to step h), otherwise going to step j);

h) switching off the bidirectional power switch and storing the actual phase angle as a phase interval start value;

i) comparing the phase interval start value with the phase angle threshold and if the phase interval start value is larger than the phase angle threshold then going to step o), otherwise going to step k);

j) comparing the actual phase angle with the phase angle threshold and if the actual phase angle is larger than or equal to the phase angle threshold then going to step o), otherwise going to step f);

k) determining the actual phase angle;

l) Comparing the actual phase angle with a value equalling pi minus the phase interval start value and if this value is reached going to step m), otherwise going to step k);

m) switching on the bidirectional power switch for allowing load current to flow through the resistive load;

n) repeating from step c);

o) Stopping the cold-start mode and optionally switching to a second mode.

8. A non-transitory computer-readable medium encoded with instructions that, when executed by a control unit, cause the control unit to execute a method of controlling a load current in a resistive load with a bidirectional power switch in a heating system that is connected to an alternating grid voltage, wherein the bidirectional power switch is controlled in a binary way, which includes a closed state, wherein the bidirectional power switch allows load current to flow in both directions and an open state, wherein the bidirectional power switch blocks the load current, the method comprising steps of:

a) starting a cold-start mode;

b) setting a current threshold and a phase angle threshold;

c) detecting a zero-crossing of the grid voltage and setting an actual phase angle to zero at this point;

d) if not already switched on then switching on the bidirectional power switch for allowing load current to flow through the resistive load;

e) measuring an actual load current through the resistive load;

f) determining an actual phase angle of the grid voltage;

g) comparing an absolute value of the actual load current with the current threshold and if the actual load current is larger than or equal to the current threshold then going to step h), otherwise going to step j);

h) switching off the bidirectional power switch and storing the actual phase angle as a phase interval start value;

i) comparing the phase interval start value with the phase angle threshold and if the phase interval start value is larger than the phase angle threshold then going to step o), otherwise going to step k);

j) comparing the actual phase angle with the phase angle threshold and if the actual phase angle is larger than or equal to the phase angle threshold then going to step o), otherwise going to step f);

k) determining the actual phase angle;

l) Comparing the actual phase angle with a value equalling pi minus the phase interval start value and if this value is reached going to step m), otherwise going to step k);

m) switching on the bidirectional power switch for allowing load current to flow through the resistive load;

n) repeating from step c);

o) Stopping the cold-start mode and optionally switching to a second mode.

* * * * *